United States Patent [19]

Sundberg et al.

[11] 4,008,100
[45] Feb. 15, 1977

[54] SHEATH FOR TUBULAR STORAGE BATTERY ELECTRODES AND METHOD FOR THEIR PRODUCTION

[75] Inventors: Erik G. Sundberg, Nol; Erik Westberg, Lidingo, both of Sweden

[73] Assignee: Aktiebolaget Tudor, Sundbyberg, Sweden

[22] Filed: Mar. 8, 1976

[21] Appl. No.: 664,997

Related U.S. Application Data

[62] Division of Ser. No. 533,499, Dec. 17, 1974, Pat. No. 3,972,728.

[30] Foreign Application Priority Data

Dec. 17, 1973 Sweden .............................. 7316973
Aug. 26, 1974 Sweden .............................. 74107699

[52] U.S. Cl. .............................. 29/623.4; 156/184; 156/244; 264/257
[51] Int. Cl.² .............................. H01M 4/80
[58] Field of Search .............. 136/43, 55, 63, 14, 136/147, 148, 75; 264/241, 257, 319, 331

[56] References Cited

UNITED STATES PATENTS

| | | |
|---|---|---|
| 2,747,007 | 5/1956 | Brandt .............................. 136/63 X |
| 2,896,006 | 7/1959 | Sundberg .............................. 136/43 |
| 2,972,000 | 2/1961 | Boriolo .............................. 136/43 |
| 3,081,368 | 3/1963 | Wunsche .............................. 136/43 |
| 3,265,535 | 8/1966 | Sundberg .............................. 136/147 X |
| 3,429,752 | 2/1969 | Sundberg .............................. 136/63 X |
| 3,503,807 | 3/1970 | Sundberg .............................. 136/43 |
| 3,694,265 | 9/1972 | Sundberg .............................. 136/43 X |
| 3,725,130 | 4/1973 | Andersson .............................. 136/43 |
| 3,801,399 | 4/1974 | Sundberg .............................. 136/43 X |
| 3,843,412 | 10/1974 | Sundberg .............................. 136/55 |

*Primary Examiner*—Anthony Skapars
*Assistant Examiner*—C. F. LeFevour
*Attorney, Agent, or Firm*—Burns, Doane, Swecker & Mathis

[57] ABSTRACT

A sheath for tubular storage battery electrodes has an inner layer of an inert fibrous material and an outer layer of thermoplastic material in the form of a net, perforated foil, or the like. The two layers are mechanically joined by heating the fibrous layer to a temperature sufficient to soften the adjacent surface of the thermoplastic material and cause a portion of the fibrous layer to be embedded in the surface of the thermoplastic layer.

7 Claims, 9 Drawing Figures

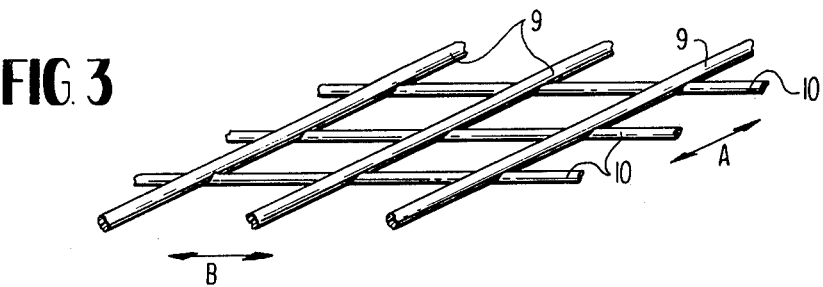
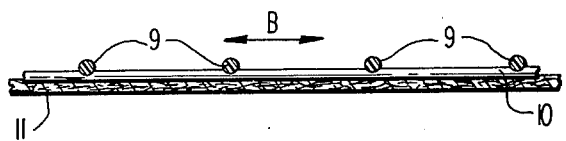
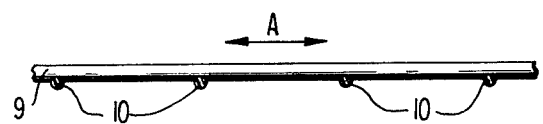
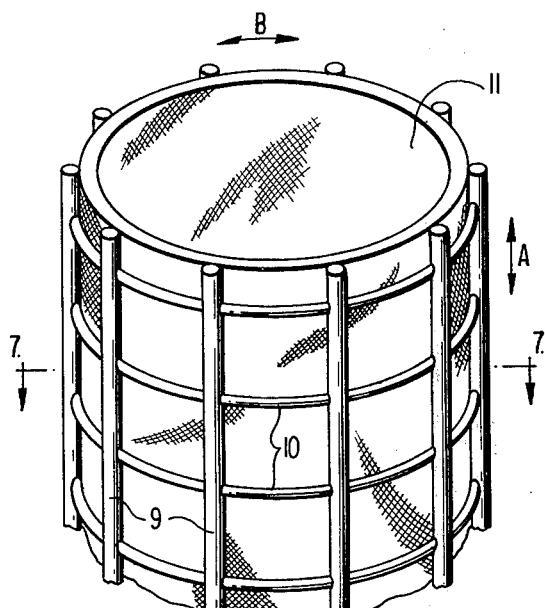
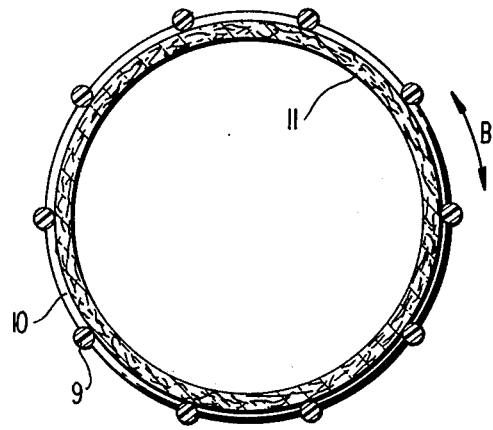
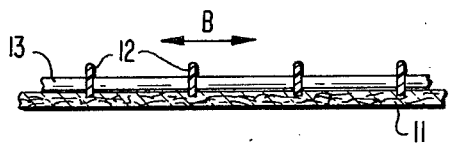
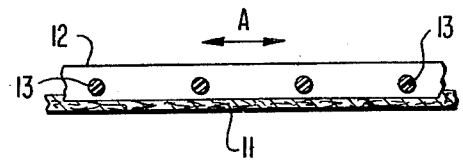

SHEATH FOR TUBULAR STORAGE BATTERY ELECTRODES AND METHOD FOR THEIR PRODUCTION

This is a division of application Ser. No. 533,499, filed Dec. 17, 1974 now U.S. Pat. No. 3,972,728.

BACKGROUND OF THE INVENTION

The present invention concerns sheaths for tubular electrodes used in electrical accumulators or storage batteries. Such electrodes are used in alkaline, as well as in lead storage batteries and comprise a number of connected, electricity-conducting rod-like or wire-like bars which are surrounded by active material. The latter, in turn is surrounded by an electrochemically inactive sheath.

The most important application of tubular electrodes is in lead storage batteries but the invention is obviously not limited to these only.

The first sheaths for tubular electrodes consisted of tubes of hard rubber into which had been notched a large number of grooves or slits parallel to one another and at right angles to the tube's axis. Since their introduction, these tubes have been improved in various ways, and considerable progress has been made in the development of a tube consisting of two layers. These first consisted of an inner layer of braided glass fiber and a outer layer of a perforated plastic sheet or film. Several other types of sheaths were subsequently developed; among them types wih several tubes connected with one another. Also, individual sheaths consisting chiefly of braided glass fiber, which are impregnated in order of one layer have been developed, such as, for example, sheaths to obtain greater stiffness and protection against chemical action. Although this improved the strength of braided glass fibers, it resulted in decreasing the porosity of the sheath, thereby lowering its permeability to electrolyte.

Double-layered sheaths possess certain advantages, among them being a relatively simple manufacturing process. The great advantage from the storage battery technology viewpoint, is that electrodes with good mechanical qualities and a good length of service are obtained.

In the production of the electrodes one first casts a bar or rod of an electricity-conducting material, for example, a lead-base alloy. In this case the grid consists of a molding or border with a number of bars projecting from it and parallel to one another. Over these bars, the tubular sheaths are then drawn, whereupon the space between the sheath and the bars is filled with active material in the form of a powder. It is impossible to carry out this filling operation if the two materials of which the sheath is made are not tightly connected. The drawing of the tubes over the bars is also rendered difficult by a poor union of the two materials. It is, therefore, essential that the two different materials in a tubular sheath consisting of two layers should be securely connected with each other. In this way one obtains to some extent an improvement of the envelope's mechanical qualities; but this is particularly important in connection with the introduction of the active material.

Formerly, union of the materials in the two layers of the sheath was effected by gluing. This, however, resulted in several disadvantages. Depending on the type used, glue had to dry or harden while the two layers were held together by means of mechanical devices, entailing an increase in the manufacturing costs and unnecessarily large equipment for the production of the sheaths. As the periods required for hardening of the glue usually are relatively very long, solution-base glue has been used for the most part. This is not desirable, however, with regard to the working environment. The gluing process also makes it difficult to obtain a sufficiently good union of the two material layers without the addition of a considerable surplus of glue. Such a surplus is a great disadvantage, as it impairs the qualities of the electrodes which are produced with the sheaths. A surplus of glue may also bring about increased production costs and environmental problems. A disadvantage of greater importance in connection with gluing is that it may prove difficult to effect a satisfactory union between the two layers. This, of course, depends on which material is used, and the conditions can be influenced by a certain preliminary treatment of the material.

OBJECTS AND SUMMARY OF THE INVENTION

One object of the present invention is to provide a novel, double-layered sheath for a tubular electrode.

Another object is to provide a double-layered sheath having improved strength and porosity.

A further object is to provide such a double-layered sheath in which the two layers are joined without the use of glue or any other extraneous adhesive.

Still a further object is to provide a novel method for making a double-layered sheath for tubular storage battery electrodes.

Yet another object is to provide such a method whereby the two layers are mechanically joined without the use of a glue or other extraneous adhesive.

The foregoing objects and others which will become apparent to those skilled in the art are achieved in accordance with the present invention in the manner described below.

In general, tubular electrode sheaths according to the present invention comprise two layers, namely an inner layer of fibrous material and an outer layer of thermoplastic material covering the inner material. The two materials are so united that only a thin layer of the surface of the fibrous material is pressed into the surface of the thermoplastic material facing it. In this way one obtains a mechanical union between the two materials. For various reasons, it is not desirable to have the fibrous material penetrate more deeply into the thermoplastic material than is necessary for a satisfactory joining. The intention thus is not to produce a reinforcement of the thermoplastic material. Of course, the different layers may comprise a number of different materials, but experience has shown that it is best to use fibrous material consisting wholly or chiefly of glass fiber, and it is, therefore, preferred for the present purpose. Glass fiber is a well-tried material for accumulator electrodes, which has proved capable of giving good qualities to the electrodes.

The thermoplastic material preferably is a polyolefine. Polyethylene and polypropylene are especially preferred. In order to provide for effective penetration of electrolyte, the thermoplastic outer layer should be readily pervious to aqueous electrolyte solutions.

In general, union of the fibrous and thermoplastic layers is achieved by heat-softening the thermoplastic surface adjacent the surface of the fibrous inner layer and pressing the two surfaces together. Heating can be done directly or indirectly, in any of several ways, as will be described in greater detail below.

Furthermore, both the inner fibrous layer and the outer thermoplastic layer may take various forms. These also are described in detail below.

BRIEF DESCRIPTION OF THE DRAWINGS

In order that the invention may be more readily understood, reference is made to the detailed description which follows and to the accompanying drawings in which:

FIG. 3 shows a preferred embodiment having a net with threads of different diameters running in two directions, A and B;

FIG. 4 shows a section through the net, at right angles to the threads running in direction A;

FIG. 5 shows a section at right angles to the threads running in direction B;

FIG. 6 shows a fragment of a sheath according to the embodiment of FIG. 3;

FIG. 7 is a cross-section on line 7—7 of FIG. 6; and

FIGS. 8 and 9 show another form of net in the same manner as FIGS. 4 and 5.

DESCRIPTION OF PREFERRED EMBODIMENTS

In accordance with the present invention, the fibrous material is provided which comprises two layers. The inner of these layers consists of a fibrous inert material. On the outside is found a thermo-plastic material in the form of a net, perforated foil, or the like. The two layers are connected with each other, at least mechanically. A preferred material combination is that the fibrous material consists chiefly of glass fibers and the thermo-plastic material is a polyolefine. The adjacent surfaces of the materials are joined to each other by softening the thermo-plastic material. This may be done either directly through heating of the plastic material or indirectly by first heating the fibrous material and then transferring the heat to the thermo-plastic material, chiefly in the contact surfaces between the two materials.

In accordance with the present invention, the fibrous material is first heated, whereupon the thermoplastic material is added. In this way there takes place, at least in the points of contact between the two layers, a softening or fusion of the thermoplastic material. Thus a union of the two materials is achieved. The heating can be done in various ways. Because of the nature of the sheath material it is suitable that the material is present on a mandrel of proper material, preferably of a metal such as steel. Proper heating methods are IR-irradiation and induction heating. First the mandrel is heated, and the heat is then transferred from it to the fibrous material. With inductive heating, the mandrel is surrounded by a spool or coil, which is fed by an alternating current whose frequency can be very high in certain applications. In this way eddy-current losses in the mandrel are produced and a strong heating of the latter is obtained. It is also possible to obtain, through suitable frequency selection, dielectric heating of the fibrous material, casued by inner molecular friction. The mandrel on which the heating takes place can then be so long that the forming of the tubular sheath takes place on it.

Figure 1:
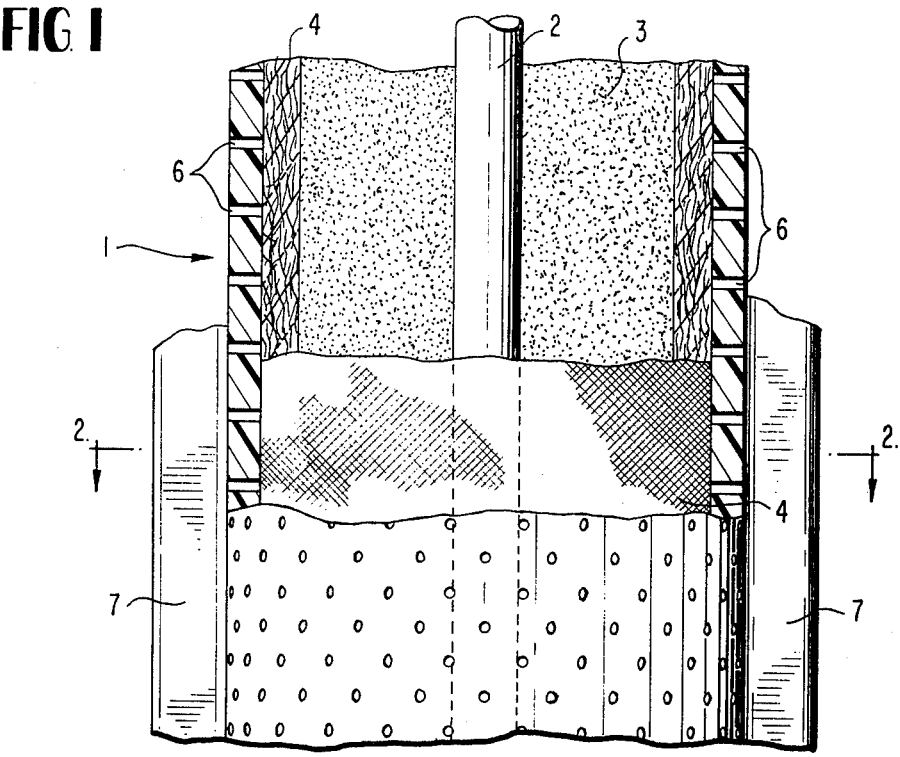
FIG. 1 is an elevation view of part of one embodiment of a tubular electrode according to the present invention, enlarged to show detail, and with parts broken away to show the internal construction.

Referring to the drawings, FIG. 1 shows a unit of a tubular electrode according to the present invention. As can be seen, the unit can comprise the usual lead or lead alloy conducting rod 2, surrounded by powdered active material 3. The two are encased in a two-layer tubular sheath, designated generally as 1, which comprises an inner fibrous layer 4 and an outer foraminous layer of thermoplastic material 5. By "foraminous" is meant that the thermoplastic layer readily permits the easy passage of electrolyte and generated gases. This is shown schematically by means of passageways 6 through the outer layer.

Figure 2:
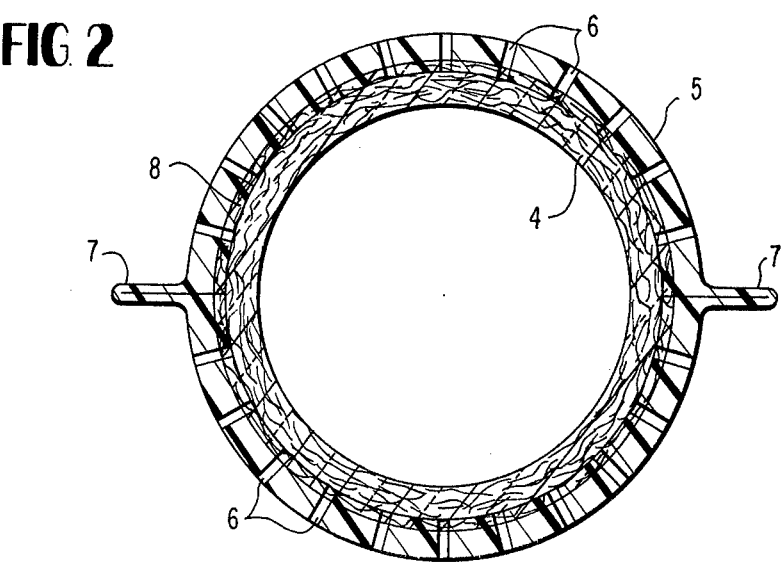
FIG. 2 is a section taken on line 2—2 of FIG. 1, also enlarged to show detail, with the conductor rod and powdered active material omitted to enhance clarity.

As already stated, an essential feature of this invention is the fact that the fibrous layer 4 is not completely embedded in the surrounding thermoplastic layer 5. Referring specifically to FIG. 2, it will be seen that only a thin outer layer 8 of the fibrous material becomes attached to the inner surface of the thermoplastic material.

The fibrous material can be made, in the familiar manner, of a braided glass fiber tube, while the thermoplastic material is formed of a flat strip or tape, or in the form of a net, as will be described in greater detail below. This tape can consist of perforated foil or some other open surface material. The tape is then given the desired geometric form at the same time that it is fastened to the fibrous material. The geometric form does not need to have a circular cross-section; many other forms are possible, such as, oval, rectangular, and the like. The thermoplastic material can be distributed on at least two tapes, which are joined together in a known manner simultaneously by means of the thermoplastic material. The joining together can then be carried out so that the axially extending ribs 7 are formed on the outside of the sheath, as shown in FIG. 1.

In the constructions used hitherto it has been found suitable to employ fibrous material in the form of braided hose or stocking. This meets the requirements with regard to handling, strength, and price. With regard to the production of the tubular sheaths according to the present invention, a braided material is also very suitable, as the fibrous material is effectively enclosed or sealed off in the thermoplastic material through fusion. This is important, as a braided material, if pulled in its longitudinal direction, increases its length with a corresponding decrease of its diameter. This, of course, must be avoided in the production and utilization of storage battery electrodes. By means of the present invention, the braid is anchored through fusion in the surface of the thermoplastic material.

As already mentioned, the thermoplastic material can be made to form axially extending ribs or borders projecting from the exterior of the sheath, as shown in FIGS. 1 and 2. The function of these ribs is to maintain distance to the nearest component, usually a separator. It is therefore suitable that each tubular sheath have at least two such ribs opposite each other on both sides of the tubular sheath. In order to facilitate orientation of the tube in the assembled electrode and to avoid deformation, sheaths may be provided with a greater number of ribs than the two shown in FIGS. 1 and 2.

According to an especially preferred aspect of the invention, the thermoplastic material is formed into a net of special construction. Such a net consists of threads which run in two different directions and must be so oriented with respect to one another that a plane through the center axes of threads that run in one direction does not coincide with a plane through the center axes of the threads running in another direction. By "plane" is meant the plane or curved surface which unites the center axes of the different threads, whether these threads have a circular or a different cross-section. By using nets of this type one can obtain the result that only threads running in one direction are fused, wholly or to a large extent, into the surface of the fibrous material and carry out the function of uniting the two layers, while the threads running in the other direction are not united (not at all or to a lesser extent) with the fibrous material. Instead they function to maintain a certain distance from the remaining components in the battery cells and of protecting the fibrous material from wear and tear. Various forms of the invention and nets of thermoplastic material suited to them are shown in FIGS. 3–9.

Referring specifically to FIGS. 3–9, the net shown in FIG. 3 consists, by way of example, of polyethylene and has threads (9) running in direction A and other threads (10) running in direction B. Threads (9) and (10) can have the same or a different cross-section, and their position with regard to one another can vary, as shown in FIGS. 4 and 5, as well as in FIGS. 8 and 9.

According to a form of the invention preferred for lead storage battery electrodes, the fibrous layer consists of a braided stocking or hose of glass fiber (11) and the surrounding tubular thermoplastic layer of polyethylene net, as shown schematically in FIGS. 6 and 7. By way of illustration, the net may consist of threads with a diameter of at least about 0.5 mm, or a little more, and a width of mesh with a distance between the threads (1) of about 3.5–4 mm. The thread diameters preferably are not the same. With such a net one obtains a free surface between 50 and 70%, a free surface between 65 and 70% being preferable. In this way one obtains the best possible construction with respect to mechanical stability, ease of electrolyte diffusion, and removal of the gases formed in the electrode.

The sheath just described can be produced in the same manner as in the case of the other embodiments described. It is, however, preferred to produce a sheath in the following manner:

The thermoplastic material is extruded through a well-known heated circular or rectangular nozzle or die, so that one obtains directly a net of the desired appearance in the form of a tube. The fibrous material is also fed through the nozzle simultaneously, and thereby is placed on the inside of the thermoplastic material. In this way one obtains a simple manufacturing process requiring only a few moments and, at the same time, the union of the two layers can be carried out directly after the nozzle, as the thermoplastic material continues to be heated. If necessary, extra heat is added. It may also be advisable to heat the fibrous material before the two layers are combined, which can take place before the nozzle. By utilizing a different supply of heat than the one which the plastic material gets in the nozzle, one also obtains this advantage: the transverse threads in the net, i.e., those which in the finished sheath lie in a plane at right angles to the axis of the sheath, soften more rapidly than the longitudinal threads, as the transverse threads can be made thinner and contain less material. The major part of the transverse threads can thus be pressed into the fibrous material, while the longitudinal threads continue to have sufficient strength to make possible a continuous feeding of the sheath material and have little contact with the sheath fibers.

The present invention, in its various aspects, has been described and illustrated as being particularly applicable to use in lead-acid storage batteries. Furthermore, the novel tubular electrode sheaths were illustrated with glass fibers constituting the fibrous layer and a polyolefine (e.g., polyethylene or polypropylene) as the thermoplastic layer. It will readily be appreciated by those skilled in the art that tubular electrode sheaths, as described, are equally applicable to the construction of alkaline batteries and that any fibrous material and thermoplastic resin which are inert to the constituents of the electrolytes (acid or alkaline) can be substituted for the glass fibers and polyolefine, respectively. It will be further apparent that the present invention is not limited to the production of the sheaths by the specific heating methods described; but that any procedural expedient by which adjacent surfaces of the fibrous and thermoplastic materials may be thermally joined falls within the scope of the method according to the present invention.

Other embodiments and variations thereof falling within the scope of the present invention will suggest themselves to those skilled in the art and it is not intended that the invention be limited except by the claims which follow.

We claim:
1. A method for producing a sheath for a tubular storage battery electrode which comprises heating a layer of an electro-chemically inert fibrous material, adding thereto a porous foraminous layer of thermoplastic material, whereby the heated fibrous material causes at least local softening of the thermoplastic layer to enable at least surface fibers to become embedded in the softened thermoplastic surface without materially reducing the porosity of the foraminous layer, and forming a tubular sheath from the combined double layer.

2. A method according to claim 1 wherein the two layers are formed into a tube around a heated mandrel.

3. A method according to claim 1 wherein the doublelayered tube is heated by means of infra-red irradiation.

4. A method according to claim 1 wherein the doublelayered tube is heated inductively by means of high frequency radiation.

5. A method according to claim 1 wherein the layer of thermoplastic material is formed of at least one strip of perforated tape or foil coated with the thermoplastic material and is formed into the desired geometric at the time it is applied to the fibrous material.

6. A method according to claim 5 wherein at least two strips of tape or foil are joined to form axially projecting external ribs in the seams between the strips.

7. A method for producing a sheath for a tubular storage battery electrode including a rod of conductive material surrounded by active material which comprises:

extruding a thermoplastic material through a heated nozzle for forming a tube-shaped net of said thermoplastic material;

heating said nozzle to a temperature sufficient to cause the surfaces of said tube-shaped net to soften while simultaneously passing an electro-chemically inert fibrous material through the nozzle to form an annular fibrous layer on the inside of said extruded tube-shaped net;

extruding said tube-shaped net with a pressure sufficient to cause only the outer fibers adjacent the inner surface of the tube-shaped net to become embedded in those surfaces of the net closest to the fibrous layer to produce a double-layered tubular sheath in which the adjacent surfaces of the inner fibrous layer and the outer thermoplastic layer are mechanically joined;

placing the formed sheath in surrounding relationship to the conductive rod; and filling the space between the rod and the sheath with active material.

* * * * *